(12) United States Patent
Zhan et al.

(10) Patent No.: US 12,155,429 B2
(45) Date of Patent: Nov. 26, 2024

(54) SYSTEMS, METHODS, AND APPARATUS FOR DETERMINING PRECODING INFORMATION FOR BEAMFORMING

(71) Applicant: Samsung Electronics Co., Ltd., Suwon-si (KR)

(72) Inventors: Qi Zhan, San Diego, CA (US); Jung Hyun Bae, San Diego, CA (US); Federico Penna, San Diego, CA (US); Hyukjoon Kwon, San Diego, CA (US); Dongwoon Bai, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 115 days.

(21) Appl. No.: 17/852,358

(22) Filed: Jun. 28, 2022

(65) Prior Publication Data

US 2023/0231600 A1 Jul. 20, 2023

Related U.S. Application Data

(60) Provisional application No. 63/301,049, filed on Jan. 19, 2022.

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC ............................ H04B 7/0456; H04B 7/0617
(Continued)

(56) References Cited

U.S. PATENT DOCUMENTS 8,634,779 B2   1/2014   Moulsley et al.
8,885,754 B2   11/2014  Kim et al.
(Continued)

FOREIGN PATENT DOCUMENTS

WO   2011111975 A2   9/2011
WO   2011136627 A2   11/2011
(Continued)

OTHER PUBLICATIONS

US 10,153,818 B2, 12/2018, Rahman et al. (withdrawn)
(Continued)

*Primary Examiner* — Leila Malek
(74) *Attorney, Agent, or Firm* — Renaissance IP Law Group LLP (57) ABSTRACT

A method may include determining, for a channel, a target component of precoding information, determining at least a part of the precoding information based on the target component and a decompressed component of the precoding information, and sending, from a user equipment, the at least a part of the precoding information. Determining the at least a part of the precoding information may be based on a correlation between the target component and the decompressed component. The at least a part of the precoding information may include a vector of coefficients. The vector of coefficients may include a vector of complex numbers. At least one of the complex numbers may include an amplitude representing a scaling coefficient and a phase representing a rotation coefficient. The target component may include a target matrix. The decompressed component may include a decompressed matrix. The target matrix may include a linear combination coefficients matrix. The precoding information may include a precoding matrix indicator.

21 Claims, 5 Drawing Sheets

(58) Field of Classification Search
USPC .......................................................... 375/267
See application file for complete search history.

(56) References Cited

U.S. PATENT DOCUMENTS

| | | |
|---|---|---|
| 8,891,472 B2 | 11/2014 | Kim et al. |
| 8,982,978 B2 | 3/2015 | Ko et al. |
| 8,989,115 B2 | 3/2015 | Koo et al. |
| 9,203,490 B2 | 12/2015 | Kim et al. |
| 9,408,196 B2 | 8/2016 | Li et al. |
| 9,425,881 B2 | 8/2016 | Kim et al. |
| 10,205,495 B2 | 2/2019 | Faxér et al. |
| 10,659,118 B2 | 5/2020 | Rahman et al. |
| 10,749,583 B2 | 8/2020 | Park et al. |
| 10,790,888 B2 | 9/2020 | Park et al. |
| 10,917,523 B2 | 2/2021 | Nam et al. |
| 11,336,356 B2 * | 5/2022 | Tosato .................. H04W 72/21 |
| 2007/0223423 A1 * | 9/2007 | Kim ...................... H04B 7/0452 370/334 |
| 2013/0094548 A1 | 4/2013 | Park |
| 2020/0252112 A1 | 8/2020 | Zhan et al. |
| 2021/0194547 A1 | 6/2021 | Jin et al. |

FOREIGN PATENT DOCUMENTS

| | | | |
|---|---|---|---|
| WO | 2011142598 A2 | 11/2011 | |
| WO | WO-2019105484 A1 * | 6/2019 | ........... H04B 7/0413 |
| WO | 2020220333 A1 | 11/2020 | |
| WO | 2021032265 A1 | 2/2021 | |

OTHER PUBLICATIONS

Ahmed, Rana et al., "Overhead Reduction of NR type II CSI for NR Release 16," WSA 2019; 23rd International ITG Workshop on Smart Antennas, Apr. 2019, 5 pages.

Nam, Young-Han, "Full Dimension MIMO for LTE-Advanced and 5G," 2015 Information Theory and Applications Workshop (ITA), Feb. 2015, 6 pages.

Onggosanusi, Eko et al., "Modular and High-Resolution Channel State Information and Beam Management for 5G New Radio," IEEE Communications Magazine, vol. 56, No. 3, Mar. 15, 2018, pp. 48-55.

Polyak, B.T., "Some Methods of Speeding up the Convergence of Iteration Methods," USSR Computational Mathematics and Mathematical Physics, vol. 4, Issue 5, 1964, pp. 1-17.

Rahman, Md Saifur et al., "CSI Feedback Based on Space-Frequency Compression," 2020 IEEE 17th Annual Consumer Communications & Networking Conference (CCNC), Jan. 2020, 6 pages.

Tsai, C. C. et al., "A Low Complexity PMI Selection Scheme for 3GPP 5G NR FDD Systems," 2021 Asia-Pacific Signal and Information Processing Association Annual Summit and Conference (APSIPA ASC), Dec. 14, 2021, pp. 1917-1922.

Zhang, R. et al., "High Resolution CSI Feedback with Beam Space MIMO," 2017 IEEE 28th Annual International Symposium on Personal, Indoor, and Mobile Radio Communications (PIMRC), Oct. 8, 2017, pp. 1-5.

* cited by examiner

SYSTEMS, METHODS, AND APPARATUS FOR DETERMINING PRECODING INFORMATION FOR BEAMFORMING

CROSS-REFERENCE TO RELATED APPLICATION

This application claims priority to, and the benefit of, U.S. Provisional Patent Application Ser. No. 63/301,049 filed Jan. 19, 2022 which is incorporated by reference.

TECHNICAL AREA

This disclosure relates generally to beamforming, and specifically to systems, methods, and apparatus for determining precoding information for beamforming.

BACKGROUND

A wireless communication system may implement a beamforming technique in which a receiver may provide precoding information to a transmitter based on channel conditions between the transmitter and the receiver. The transmitter may use the precoding information to perform beamforming for transmissions to the receiver.

The above information disclosed in this Background section is only for enhancement of understanding of the background of the invention and therefore it may contain information that does not constitute prior art.

SUMMARY

A method may include determining, for a channel, a target component of precoding information, determining at least a part of the precoding information based on the target component and a decompressed component of the precoding information, and sending, from a user equipment, the at least a part of the precoding information. Determining the at least a part of the precoding information may be based on a correlation between the target component and the decompressed component. The at least a part of the precoding information may include a vector of coefficients. The vector of coefficients may include a vector of complex numbers. At least one of the complex numbers may include an amplitude representing a scaling coefficient, and a phase representing a rotation coefficient. The target component may include a target matrix, and the decompressed component may include a decompressed matrix. The target matrix may include a linear combination coefficients (LCC) matrix. The precoding information may include a precoding matrix indicator (PMI). Determining the at least a part of the precoding information may include calculating the precoding information based on the target component and the decompressed component. The calculating may include performing an iterative operation. The iterative operation may include a gradient descent operation. The iterative operation may include a heavy ball operation. The method may further include determining a channel condition, and the determining the target component of the precoding information may include based on the channel condition. The decompressed component may include a decompressed version of the target component.

An apparatus may include a receiver configured to receive a reference signal using a channel, a transmitter configured to send precoding information for the channel, and a controller configured to determine a target component of the precoding information based on the reference signal, and determine at least a part of the precoding information based on the target component and a decompressed component of the precoding information. The controller may be configured to determine the at least a part of the precoding information based on a correlation between the target component and the decompressed component. The at least a part of the precoding information may include one or more coefficients, the target component may include a target precoding coefficients matrix, and the decompressed component may include a decompressed version of the target component.

A user equipment may include at least one processor configured to determine a target component of a precoding matrix for a downlink channel based on a condition of the downlink channel, determine a decompressed component of the precoding matrix, determine at least a part of the precoding matrix based on the target component and the decompressed component, compress the precoding matrix to generate a compressed component, and send the compressed component using an uplink channel. The at least one processor may be configured to determine the at least a part of the precoding matrix based on a correlation between the target component and the decompressed component. The at least one processor may be configured to determine the target component based on a coefficient matrix and a vector of scaling and rotation coefficients.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

A wireless base station may use channel state information (CSI) feedback from a user equipment (UE) for beamforming in a downlink (DL) channel to the UE. The UE may provide the feedback to the base station in the form of precoding information such as a precoding matrix or a precoding matrix indicator (PMI). Reporting the precoding information to the base station, however, may involve a significant amount of uplink (UL) overhead.

To reduce the UL overhead, the UE may use feedback compression to compress the precoding information (for example, using spatial compression and/or frequency compression) before transmitting the precoding information to the base station in a UL channel. The base station may then decompress the precoding information and use it for beamforming in the DL channel. Compressing the precoding information, however, may reduce the effectiveness of the precoding information.

Some of the inventive principles of this disclosure involve techniques for determining at least a part of precoding information based on a target component of precoding information and a corresponding decompressed component of the precoding information. For example, in some embodiments, a value (e.g., an optimized value) of a vector of scaling and rotation coefficients for precoding information may be determined based on a correlation between a target linear combination coefficient (LCC) matrix (e.g., an ideal LCC matrix) calculated at the UE and a corresponding decompressed LCC matrix at the base station. In some embodiments, the value of the vector of scaling and rotation coefficients may be optimized, for example, by maximizing the correlation between the target LCC matrix and the decompressed LCC matrix. In some embodiments, one or more scaling and/or rotation coefficients may be optimized on a per-subband basis. Depending on the implementation details, the use of one or more techniques for determining precoding information in accordance with the principles of this disclosure may improve the effectiveness of the precoding information (e.g., block error rate (BLER), signal-to-noise ratio (SNR), and/or the like) on a DL channel.

In some embodiments, a correlation between a target component of precoding information and a corresponding decompressed component of the precoding information may be expressed in a mathematically principled manner, for example, as an objective function. The objective function or other mathematical expression may be solved in any suitable manner. For example, if the expression does not readily admit a closed-form solution, it may be solved using an iterative algorithm such as gradient descent (GD).

This disclosure encompasses numerous inventive principles relating to precoding information for beamforming. These principles may have independent utility and may be embodied individually, and not every embodiment may utilize every principle. Moreover, the principles may also be embodied in various combinations, some of which may amplify the benefits of the individual principles in a synergistic manner.

For purposes of illustration, some embodiments may be described in the context of specific implementation details and/or applications such as coefficients for precoding information that may be determined by a UE and sent to a gNodeB (gNB) base station in a fifth generation (5G) New Radio (NR) system for beamforming in a DL channel. However, the inventive principles are not limited to these details and/or applications and may be applied in any other context in which a first apparatus may provide channel feedback in the form of precoding information to a second apparatus, regardless of whether any of the apparatus may be base stations, UEs, peer devices, and/or the like, and regardless of whether a channel may be a UL channel, a DL channel, a peer channel, and/or the like. Moreover, the inventive principles may be applied to any type of wireless communication systems that may utilize beamforming such as other types of cellular networks (e.g., 4G LTE, 6G, and/or any future generations of cellular networks), Bluetooth, Wi-Fi, and/or the like.

In some wireless communication systems, a first apparatus may rely on a second apparatus to provide information on channel conditions to enable the second apparatus to perform beamforming in a channel between the two apparatus. For example, in a 5G NR system operating in a frequency domain duplexing (FDD) mode, a lack of reciprocity between UL and DL channels may cause a gNB to rely on channel state information (CSI) feedback from a UE to determine channel conditions in a DL channel for precoding (e.g., for beamforming).

Figure 1:
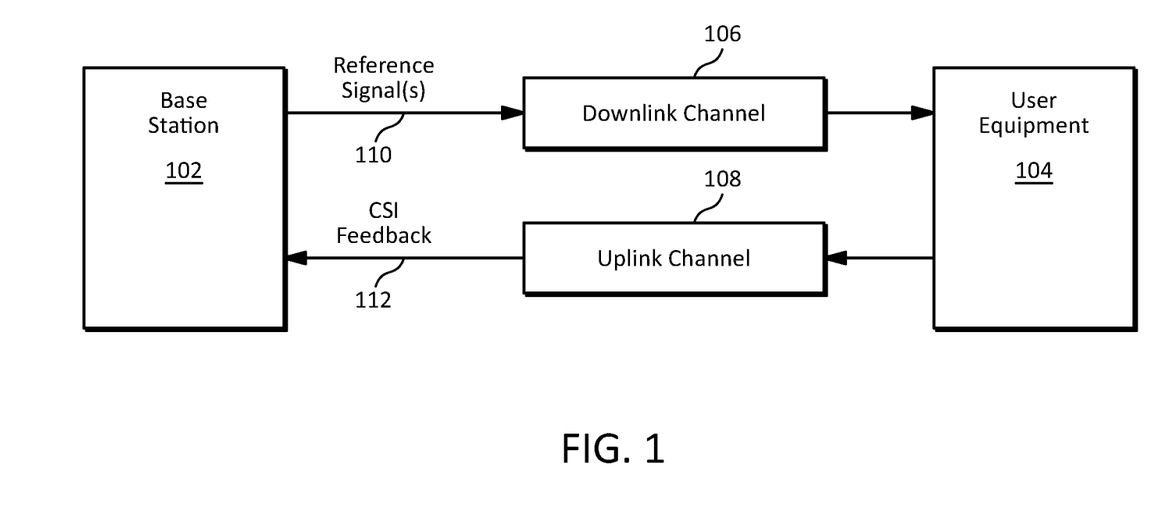
FIG. 1 illustrates an embodiment of a wireless system in which a UE provides channel condition feedback to a base station.

FIG. 1 illustrates an embodiment of a wireless system in which a UE provides channel condition feedback to a base station. The embodiment illustrated in FIG. 1 may include a base station (e.g., a gNB) 102 and a UE 104 connected by a DL channel 106 and a UL channel 108.

The base station 102 may send one or more reference signals 110 to the UE 104 in the DL channel 106. The UE 104 may determine the DL channel conditions by measuring how the DL channel 106 affects the reference signals 110, then send CSI feedback 112 to the base station 102 in the UL channel 108. The base station 102 may then use the CSI feedback 112 to implement a DL precoding scheme for beamforming (e.g., to reduce interference between users) in the DL channel 106.

In 5G NR systems, a Type-I codebook may be used to provide implicit CSI feedback to a base station in the form of an index that may point to a predefined PMI selected by the UE based on the DL channel conditions. Implicit CSI feedback may provide adequate performance, for example, in embodiments with a limited number of antenna ports and/or users. However, in systems with larger numbers of antenna ports and/or users (e.g., multiple-input multiple-output (MIMO) systems), the relatively low resolution of a Type-I codebook may not provide CSI feedback with adequate accuracy.

In 5G NR systems, a Type-II codebook may be used to provide explicit CSI feedback in which a UE may determine one or more dominant eigenvectors or singular vectors per subband based on DL channel conditions. The UE may then use the dominant eigenvectors or singular vectors to derive a PMI that may be fed back to the gNB which may use the PMI for beamforming in the DL channel. However, in some embodiments, and depending on the implementation details, reporting Type-II CSI feedback information to a gNB may involve a significant amount of overhead (e.g., sending a significant amount of data on a UL channel).

In some embodiments of wireless systems, one or more types of compression may be applied to channel condition information to reduce the overhead associated with providing channel condition feedback to a base station. For example, 5G NR systems beginning with Release 15 (Rel-15) may implement spatial compression in which a singular vector matrix E (which may have columns corresponding to dominant singular vectors of the channel for $N_3$ subbands (SBs)) may be compressed in the spatial domain by performing linear combination (LC) in the spatial domain (SD).

As another example, to provide further compression, 5G NR systems beginning with Release 16 (Rel-16) may implement an eType-II codebook that may use joint spatial and frequency compression in which dominant singular vectors for one or more subbands (SBs) may be compressed jointly in the spatial domain (SD) and the frequency domain (FD).

In some embodiments, one or more additional techniques may be used to reduce the amount of data sent to a base station to report channel conditions. For example, quantization may be used to reduce the number of bits used to represent a numerical value. As another example, coefficient reduction may treat relatively small values of coefficients as zero and thus not report these values to the base station. In some embodiments, one or more of the additional techniques to reduce the amount of data sent to a base station to report channel conditions may be considered a form of compression.

In some embodiments, an eType-II codebook configuration may be used to select a precoding matrix indicator (PMI) as follows:

$$W = W_1 W_2 \quad (1)$$

where W may represent a precoding matrix (e.g., for a given layer), $W_1$ may represent a beam selection matrix such that $$W_1 \in \mathbb{C}^{N_T \times 2L} \quad (2)$$

and $W_2$ may represent a linear combination coefficients (LCC) matrix such that $$W_2 \in \mathbb{C}^{2L \times N_3} \quad (3)$$

where $N_T$ may indicate a number of transmit (Tx) ports, L may indicate a number of beams, $N_3$ may indicate a number of PMI subbands, M may indicate a number of compressed Discrete Fourier Transform (DFT) components, and the notation $\mathbb{C}^{a \times b}$ may indicate a matrix having dimensions a and b.

With an eType-II codebook configuration, the precoding matrix W may be determined, for example, using a three-part procedure. During a first part of the procedure, a UE may determine the beam selection matrix $W_1$, for example, by selecting one or more beams (e.g., selecting L beams out of a grid of $N_1 N_2$ possible beams where $N_1$ may represent the number of horizontal beams and $N_2$ may represent the number of vertical beams) based on a correlation with the channel matrix H or its dominant singular vectors (e.g., a singular vector matrix E). For example, in some embodiments, the one or more beams of $W_1$ may be selected by maximizing the correlation.

During a second part of the three-part procedure, the LCC matrix $W_2$ may be determined. In some embodiments, a target LCC matrix V such that $$V \in \mathbb{C}^{2L \times N_3} \quad (4)$$

may be computed, for example, using singular value decomposition (SVD) of $HW_1$. However, other techniques for determining $W_1$ and/or V may be used. In some embodiments, the target LCC matrix V may represent an ideal LCC matrix, an optimized LCC matrix, a desired LCC matrix, and/or the like.

In embodiments in which uplink overhead is not a concern, the target LCC matrix V may be used as $W_2$, and $W_1$ and $W_2$ may be reported to the base station (e.g., gNB) which may use the precoding matrix $W = W_1 W_2$ for beamforming in the DL channel.

Thus, the first part of the procedure for determining the precoding matrix W may involve selecting L beams out of a grid of $N_1 N_2$ possible beams (e.g., determining the beam selection matrix $W_1$), and the second part of the procedure may involve determining how to combine the selected beams (e.g., by determining the LCC matrix $W_2$). In some embodiments, a Type-II codebook configuration may be implemented with these first two parts.

However, in some embodiments, reporting the entire LCC matrix $W_2$ to the base station as channel condition feedback may involve transmitting a number of coefficients determined by $2 \times L \times N_3$ times the number of layers. Depending on the implementation details, this may generate an unacceptable amount of overhead.

Therefore, in some embodiments, a procedure for implementing an eType-II codebook configuration may include a third part in which the LCC matrix $W_2$ may be subjected to frequency domain (FD) compression to reduce the amount of data reported to the base station as channel condition feedback. For example, in some embodiments, FD compression may involve determining $M < N_3$ DFT bases.

In some embodiments, a third part of a procedure for implementing an eType-II codebook configuration may further reduce the amount of data reported to the base station by using coefficient reduction in which coefficients having relatively small values may be set to zero and not reported to the base station. For example, a UE may report up to $K_0 < 2LM$ non-zero coefficients. In some embodiments, one or more values in the LCC matrix $W_2$ may be quantized prior to sending to the base station.

In some embodiments, for convenience, multiple techniques for reducing the amount of data reported to a base station as channel condition feedback (e.g., SD compression, FD compression, coefficient reduction, quantization, and/or the like) may be referred to collectively as feedback compression or simply compression. In some embodiments, for convenience, PMI and/or precoding information may also refer to any type of precoding information for beamforming in any type of wireless communication system such as cellular, Wi-Fi, Bluetooth, and/or the like.

In some embodiments, an eType-II codebook configuration may exploit a frequency domain correlation in $W_2$ to implement feedback compression. For example, in a system with 2L spatial domain (SD) beams and $N_3$ subbands, a frequency compression matrix $W_f$ having a size $N_3 \times M$ may be selected (e.g., from the columns of an oversampled DFT codebook to form an orthogonal subset of a basis set of the codebook). The frequency compression matrix $W_f$ may be applied (e.g., at each layer) to the LCC matrix $W_2$ to obtain a matrix of linear combination coefficients $\tilde{W}_2$ as follows:

$$\tilde{W}_2 = W_2 W_f \quad (5)$$

which may be rewritten as $$W_2 = \tilde{W}_2 W_f^H \quad (6)$$

where H may denote a conjugate transpose (also known as a Hermitian operator).

In some embodiments, because the frequency compression matrix $W_1$ may have a size $N_3 \times M$ and the LCC matrix $W_2$ may have a size $2L \times N_3$, applying DFT compression to $W_2$ may result in $M < N_3$ frequency domain (FD) basis vectors being selected after compression. In some embodiments, FD compression may be applied to each layer to obtain the matrix of linear combination coefficients $\tilde{W}_2$. In some embodiments, one or more elements inside the matrix of linear combination coefficients $\tilde{W}_2$ may be referred to as FD coefficients.

Thus, in some embodiments, a final precoder W obtained with an eType-II codebook configuration may be written as $$W = W_1 \tilde{W}_2 W_f^H \quad (7)$$

where, in some embodiments, $W_f$ may be obtained by taking M columns from a DFT matrix F, and thus $W_f$ may be described as a selection of M out of $N_3$ columns from a full DFT matrix F.

In some embodiments, and depending on the implementation details, feedback compression may reduce UL overhead by reducing the amount of channel condition feedback data sent to a base station. However, compressing the feedback data may reduce the accuracy, effectiveness, and/or the like, of the feedback information, and thus, the resulting PMI, beamforming, and/or the like on the DL channel.

Figure 2:
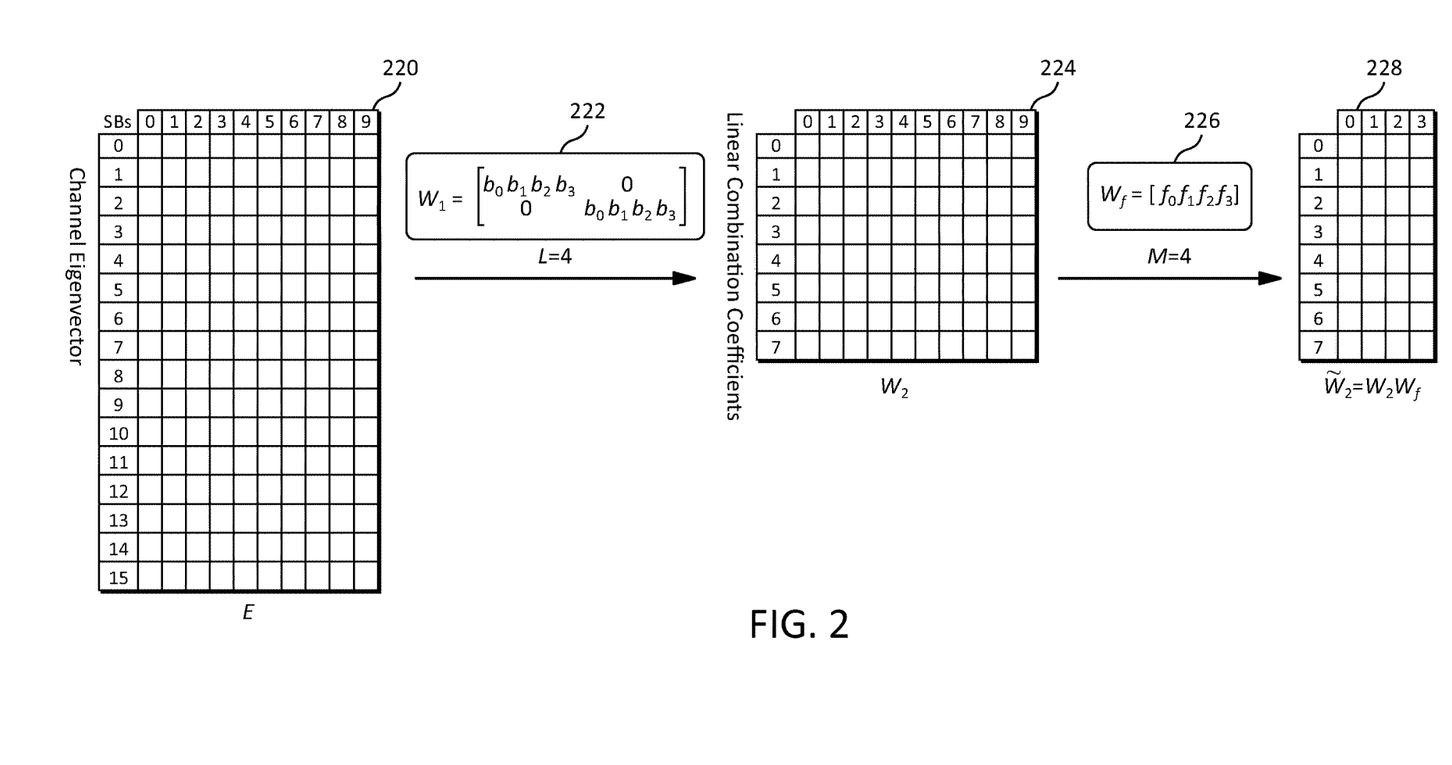
FIG. 2 illustrates an embodiment of spatial and frequency compression of channel condition feedback in a wireless system.

FIG. 2 illustrates an embodiment of spatial and frequency compression of channel condition feedback in a wireless system. In the embodiment illustrated in FIG. 2, one or more columns of a singular vector matrix E (shown as element 220) may be spatially compressed by performing a linear combination using an SD basis matrix $W_1$ (shown as element 222). In the resulting spatially compressed matrix $W_2$ (shown as element 224), linear combination coefficients may be correlated.

The resulting spatially compressed matrix $W_2$ may then be frequency compressed using a frequency compression matrix $W_f$ (shown as element 226) to generate a spatially and frequency compressed matrix $\tilde{W}_2$ (shown as element 228) such that $$\tilde{W}_2 = W_2 W_f \quad (8)$$

Some of the inventive principles of this disclosure involve techniques for determining precoding information based on a target component of precoding information and a corresponding decompressed component of the precoding information. In some embodiments, this may be understood with reference to Equation (9) where, once the UE computes the target LCC matrix V (for a given layer), the de-compressed LCC matrix $W_2$ at the base station (e.g., gNB) side may be written, for each row $k \in \{1, \ldots, 2L\}$, as $$W_2(k,:) = V(k,:) U F S_k F^H \quad (9)$$

where $$V(k,:) \in \mathbb{C}^{1 \times N_3} \quad (10)$$

may represent the k-th row of a target LCC matrix V, $$U = \mathrm{diag}(u) \quad (11)$$

may represent a diagonal matrix U in which $$u \in \mathbb{C}^{N_3 \times 1} \quad (12)$$

may represent a vector of per-subband rotation and/or scaling coefficients, $$F \in \mathbb{C}^{N_3 \times N_3} \quad (13)$$

may represent a DFT matrix F, $$S_k = \mathrm{diag}(s_k) \quad (14)$$

may represent a diagonal matrix in which $$s_k \in \{0,1\}^{N_3 \times 1} \quad (15)$$

may represent a binary vector of zeros and ones. In some embodiments, one or more of the $N_3$ coefficients (e.g., relatively small coefficients) may be set to zero to implement coefficient reduction. Thus, in some embodiments, $S_k$ may contain $\leq M$ ones.

In some embodiments, the process characterized by Equation (9) may be applied on a per-layer basis, and thus, the results may be multiplied by the number of layers.

In some embodiments, Equation (9) may be characterized as describing an overall process for compressing and/or selecting precoding information at a UE, sending it to a based station, and decompressing the precoding information at the base station. For example, in some embodiments, the target LCC matrix V may represent an ideal or optimized LCC matrix.

To send a row k of the target LCC matrix V to the base station, it may be multiplied by the diagonal matrix U to provide one or more per-subband rotation and/or scaling coefficients, then multiplied by the DFT matrix F to perform FD compression and/or domain conversion (e.g., to a frequency domain or a compressed domain over the subbands). In the converted domain, the compressed results may be multiplied by the diagonal matrix $S_k$ which may perform a selection function, for example, for coefficient reduction. In some embodiments, some or all of the values generated during the overall process may be quantized.

The resulting rows ($V(k,:)UFS_k$) of the target LCC matrix V, which have been processed with FD compression and/or coefficient reduction, may then be transmitted to the base station (e.g., using an indicator or other technique that may include less than the entire vector of coefficients) which may perform decompression, for example, by multiplying by the inverse (e.g., Hermitian) DFT matrix $F^H$ to generate the decompressed LCC matrix $W_2$ at the base station.

In some embodiments, the compression, coefficient reduction, quantization, decompression, and/or the like, described above with respect to Equation (9) may result in a suboptimal precoding matrix which may cause a lower data rate over the DL channel.

In some embodiments, one or more techniques in accordance with the principles of this disclosure may determine precoding information based on a target component of the precoding information, and a corresponding decompressed component of the precoding information. For example, in some embodiments, a UE may adjust one or more of the coefficients in the vector u of per-subband rotation and/or scaling coefficients in Equation (12) to make one or more aspects of the decompressed LCC matrix $W_2$ at the base station closer to the target LCC matrix V in Equation (9). In some embodiments, this may be accomplished, for example, by optimizing the vector u by maximizing the correlation between the target LCC matrix V (e.g., an ideal matrix) and the normalized $W_2$ at the base station (e.g., the de-compressed precoding matrix after power normalization is applied by a gNB).

Figure 3:
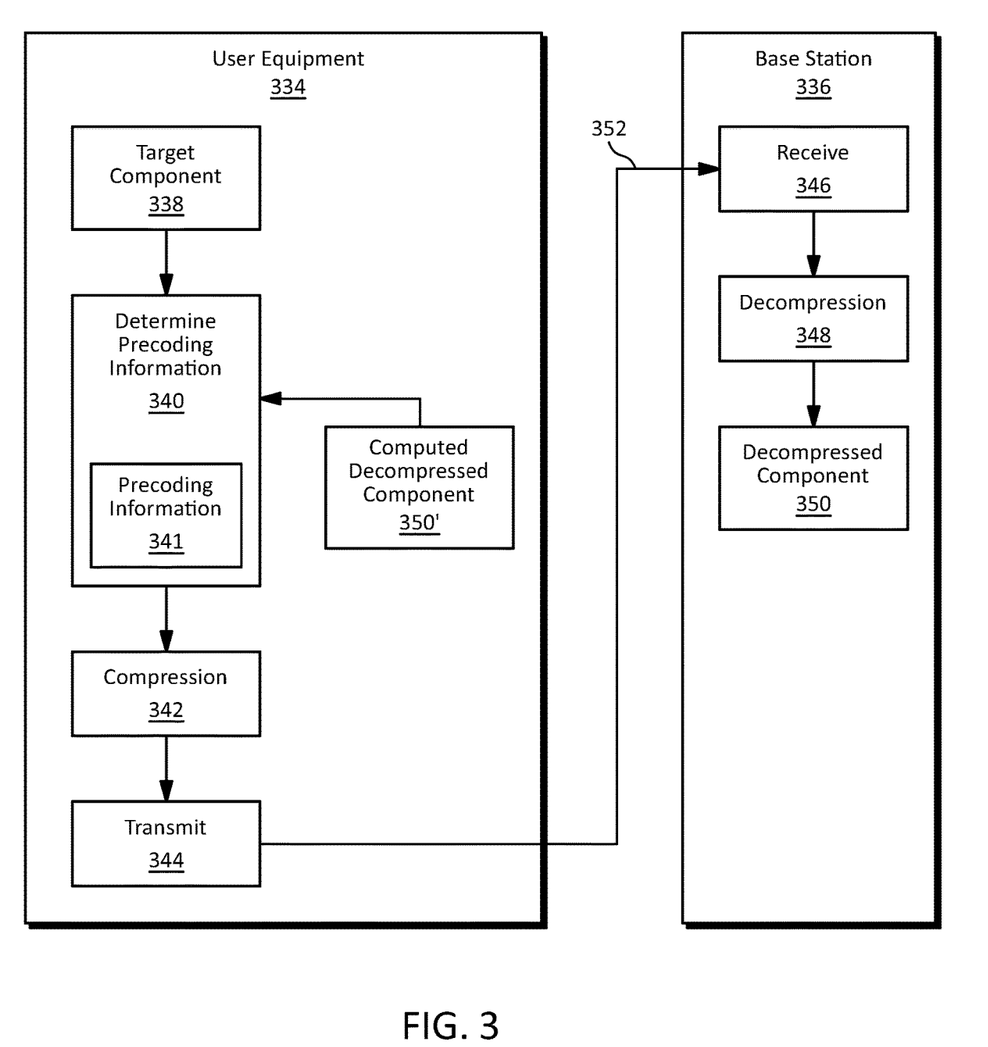
FIG. 3 illustrates an embodiment of a scheme for determining precoding information based on a target component of the precoding information and a decompressed component of the precoding information in accordance with the principles of this disclosure.

FIG. 3 illustrates an embodiment of a scheme for determining precoding information based on a target component of the precoding information and a decompressed component of the precoding information in accordance with the principles of this disclosure. In the embodiment illustrated in FIG. 3, a UE 334 may determine a target component 338 of the precoding information. For example, in some embodiments, the UE 334 may calculate a target LCC matrix and/or a PMI to be used by a base station 336 for beamforming in a DL channel to the UE 334. At an operation 340, the UE 334 may determine precoding information 341 (e.g., using one or more parameters such as gradient descent parameters that may be used to determine the precoding information) based on the target component 338 and a computed decompressed component 350', which may be a locally computed version of the decompressed component 350 that may be applied by the base station 336. For example, in some embodiments, the UE 334 may determine one or more coefficients (e.g., one or more optimized rotation and/or scaling coefficients) based on a correlation between a target LCC matrix and a decompressed version of the target LCC matrix that may be generated by the base station 336.

At operation 342, the UE 334 may compress one or more components of the precoding information, and at operation 344, the UE 334 may transmit the compressed precoding information 352 to the base station 336. For example, in some embodiments, the compression operation 342 may perform spatial domain (SD) and/or frequency domain (FD) compression, coefficient reduction, quantization, and/or the like, on an LCC matrix of a PMI. In some embodiments, FD compression may be performed by multiplication by a frequency compression matrix. In some embodiments, the transmission operation 344 may transmit the compressed precoding information to the base station 336 through a UL channel. At operation 346, the base station 336 may receive the compressed precoding information. At operation 348, the base station 336 may perform a decompression operation on the received precoding information to generate a decompressed component 350 of the precoding information. For example, in some embodiments, the decompression operation 346 may be performed by multiplying the received compressed precoding information by an inverse (e.g., Hermitian) frequency compression matrix.

For purposes of illustration, the embodiment illustrated in FIG. 3, shows various operations being performed in specific orders by various specific components. However, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

In some embodiments, the UE 334 may exploit one or more known aspects of the spatial and/or frequency compression, coefficient reduction, quantization, and/or the like that may be applied to the target component 338 at operation 342 to make one or more aspects of the decompressed component 350 at the base station closer to the target component 338. However, in other embodiments, the UE 334 may implement one or more learning algorithms (e.g., machine learning, heuristics, and/or the like to reduce the variation between the decompressed component 350 at the base station and the target component 338 at the UE.

In some embodiments, the process of compression (which may include quantization, coefficient selection and/or reduction, and/or the like) at the UE and then decompression at the base station may be characterized as distorting the precoding information (e.g., distorting the PMI or a component thereof). Thus, in some embodiments, determining precoding information based on a target component of the precoding information and a decompressed component of the precoding may be characterized as pre-distorting or compensating the precoding information or component thereof (at least partially) in a manner that may offset or cancel the distortion caused by the compression and/or decompression processes.

In some embodiments, one or more mathematically principled techniques may be used to determine precoding information based on a target component of the precoding information and a decompressed component of the precoding information. For example, an objective function may be used to adjust (e.g., optimize) a vector u of per-subband rotation and/or scaling coefficients to increase (e.g., maximize) a correlation between a target LCC matrix V, and a de-compressed LCC matrix $W_2$ (e.g., after power normalization at a base station) as follows $$\hat{u} = \arg\max_u \underbrace{\sum_{i=1}^{N_3} \left| \frac{V(:,i)^H W_2(:,i)}{\sqrt{W_2(:,i)^H W_2(:,i)}} \right|^2}_{\stackrel{def}{=} G_i(u)} \quad (16)$$

which may be rewritten $$\hat{u} = \arg\max_u \sum_{i=1}^{N_3} \frac{u^H A_i u}{u^H T_i u} \quad (17)$$

where $\hat{u}$ may refer to a calculated value (e.g., a value that may be optimized, solved, evaluated, estimated, and/or the like) of a vector u of per-subband rotation and/or scaling coefficients, $$A_i \stackrel{def}{=} Q_i^H V(:,i) V(:,i)^H Q_i \quad (18)$$

$$T_i \stackrel{def}{=} Q_i^H Q_i \quad (19)$$

$$Q_i(k,:) \stackrel{def}{=} V(k,:) \operatorname{diag}(\overline{W}_k(:,i)) \quad (20)$$

such that $$W_2(:,i) = Q_i u \quad (21)$$

and $$\overline{W}_k \stackrel{def}{=} F S_k F^H. \quad (22)$$

In some embodiments, Equation (16) and/or Equation (17) may be solved, evaluated, estimated, optimized, and/or the like, using one or more iterative algorithms such as gradient descent (GD) and/or a heavy ball (HB) variation of GD. (One or more iterative algorithms may be used, for example, in embodiments in which Equation (16) and/or Equation (17) may not admit a closed-form solution and/or may be non-convex.)

In some embodiments (e.g., in Equations (9) through (11)), u may be a part of the precoding information, while the precoding information may refer to a larger set (e.g., an entire set) of PMI coefficients that may be reported by a UE to a base station. Thus, in some embodiments, u may be a subset of the precoding information.

In some embodiments, to apply one or more iterative methods such as GD and/or HB, an update rule at iteration n may be as follows $$\hat{u}_{n+1} = \hat{u}_n + \gamma_n \sum_{i=1}^{N_3} d_i(\hat{u}_n) + \beta_n(\hat{u}_n - \hat{u}_{n-1}) \quad (23)$$

where $\gamma_n$ may represent a step size, $\beta_n$ may represent an HB coefficient, and $\hat{u}_0$ may represent a starting point for the iterative method. In some embodiments in which $\beta_n$ may be zero, Equation (23) may implement a simple GD.

Depending on the implementation details, for example, a step size, an HB coefficient, and/or the like, a choice of starting value may or may not have a significant effect on whether Equation (16) and/or Equation (17) converges to a solution (e.g., an solution that may be optimal, near-optimal, approximate, and/or the like), the speed of convergence, and/or the like.

In some embodiments, the starting point $\hat{u}_0$ may be implemented with a heuristic value such as rotation by a phase of a first beam and/or polarization as follows $$\hat{u}_0 = e^{-j\angle V(1,:)} \tag{24}$$

where the angle operator $\angle$ may indicate a phase rotation. Alternatively, or additionally, the starting point $\hat{u}_0$ may be implemented with another heuristic value such as rotation by a phase of an average over one or more beams and/or polarizations as follows $$\hat{u}_0 = e^{-j\angle \sum_{k=1}^{2L} V(k,:)}. \tag{25}$$

In some embodiments, $d_i(u)$ as set forth in Equation (25) may be implemented as the derivative of $G_i(u)$, which may be expressed in a closed form as follows $$d_i(u) \stackrel{def}{=} \frac{\partial G_i(u)}{\partial u} = \left( \frac{2A_i}{u^H T_i u} - 2T_i \frac{u^H A_i u}{(u^H T_i u)^2} \right) u \tag{26}$$

which, depending on the implementation details, may be set to zero to determine a local minimum and/or maximum.

Within a framework for an iterative algorithm as set forth herein, one or more of the following parameters may be adjusted: (1) a number of iterations; (2) one or more values of a step size $\gamma_n$ (which may be fixed and/or variable); (3) one or more values of the HB coefficient $\beta_n$ (e.g., for GD and/or HB); (4) one or more normalized or un-normalized gradients; and/or the like. The inventive principles are not limited to any specific values of the parameters disclosed herein. However, for purposes of illustration, an embodiment that may use the following parameters may provide a relatively low complexity implementation with significant improvement in BLER and/or SNR: 5 iterations; fixed step size $\gamma\_n=1$; simple GD (i.e., $\beta_n=0$); and an un-normalized gradient.

In some embodiments, the one or more parameters may be adjusted by the UE 334 in real-time during operation of the UE 334, but in other embodiments, one or more parameters may be adjusted offline and/or by any other apparatus such as the base station 336.

Figure 4:
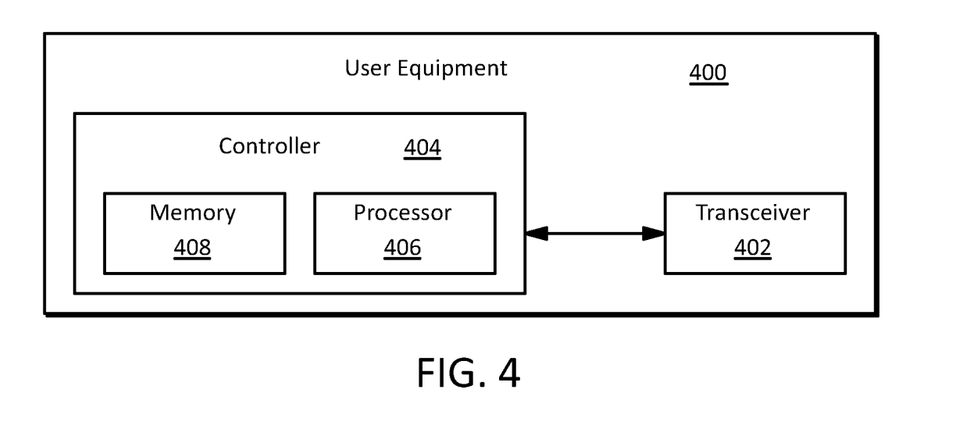
FIG. 4 illustrates an example embodiment of a user equipment in accordance with the principles of this disclosure.

FIG. 4 illustrates an example embodiment of a user equipment (UE) in accordance with the disclosure. The embodiment 400 illustrated in FIG. 4 may include a radio transceiver 402 and a controller 404 which may control the operation of the transceiver 402 and/or any other components in the UE 400. The UE 400 may be used, for example, to implement any of the functionality described in this disclosure including determining DL channel conditions based on one or more reference signals from a base station, determining one or more parameters of precoding information (e.g., optimizing a vector of rotation and/or scaling coefficients) based on a target component (e.g., a target LCC matrix) and a decompressed component (e.g., a decompressed LLC matrix at a base station), compression, quantization, coefficient reduction, and/or the like.

The transceiver 402 may transmit/receive one or more signals to/from a base station, and may include an interface unit for such transmissions/receptions. For example, the transceiver 402 may receive one or more signals from a base station and/or may transmit precoding information, e.g., one or more PMI components to a base station on a UL channel.

The controller 404 may include, for example, one or more processors 406 and a memory 408 which may store instructions for the one or more processors 406 to execute code to implement any of the functionality described in this disclosure. For example, the controller 404 may be configured to implement functionality for determining DL channel conditions based on one or more reference signals from a base station, determining one or more parameters of precoding information (e.g., optimizing a vector of rotation and/or scaling coefficients) based on a target component (e.g., a target LCC matrix) and a decompressed component (e.g., a decompressed LLC matrix at a base station), compression, quantization, coefficient reduction, and/or the like.

Figure 5:
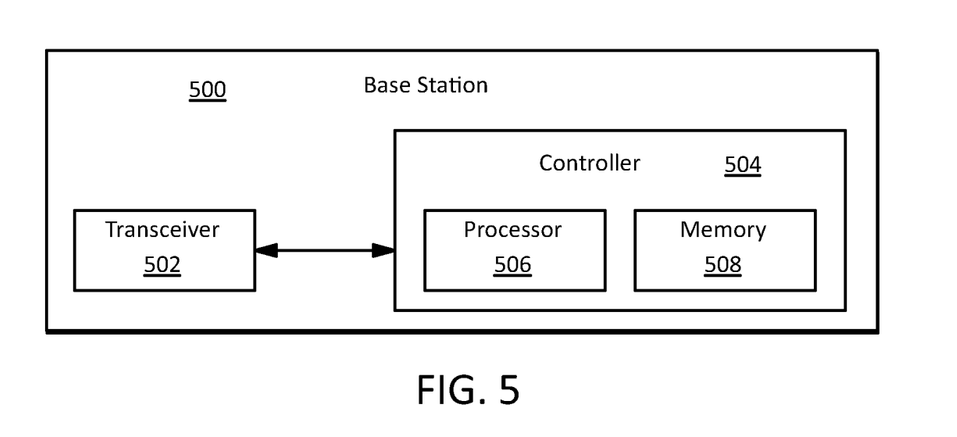
FIG. 5 illustrates an example embodiment of a base station in accordance with the principles of this disclosure.

FIG. 5 illustrates an example embodiment of a base station in accordance with the disclosure. The embodiment 500 illustrated in FIG. 5 may include a radio transceiver 502 and a controller 504 which may control the operation of the transceiver 502 and/or any other components in the base station 500. The base station 500 may be used, for example, to implement any of the functionality described in this disclosure including transmitting one or more reference signals to a UE on a DL channel, receiving precoding information from a UE on a UL channel, decompressing precoding information, and/or the like.

The transceiver 502 may transmit/receive one or more signals to/from a user equipment, and may include an interface unit for such transmissions/receptions. For example, the transceiver 502 may transmit one or more reference signals to a UE on a DL channel and/or receive receiving precoding information from a UE on a UL channel.

The controller 504 may include, for example, one or more processors 506 and a memory 508 which may store instructions for the one or more processors 506 to execute code to implement any of the base station functionality described in this disclosure. For example, the controller 504 may be used to implement functionality for decompressing precoding information, and/or the like.

In the embodiments illustrated in FIGS. 4 and 5, the transceivers 402 and 502 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 404 and/or 504 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more processors such as microcontrollers, CPUs such a complex instruction set computer (CISC) processors such as x86 processors and/or reduced instruction set computer (RISC) processors such as ARM processors, and/or the like, executing instructions stored in any type of memory, graphics processing units (GPUs), neural processing units (NPUs), tensor processing units (TPUs), and/or the like.

Figure 6:
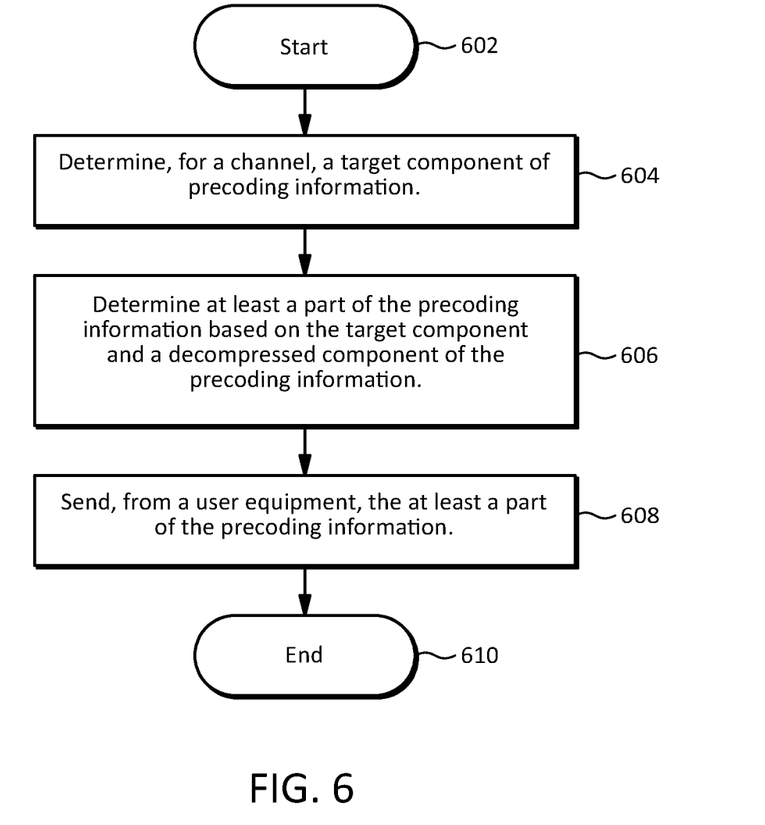
FIG. 6 illustrates an embodiment of a method for adjusting the timing of a transform window in accordance with the principles of this disclosure.

FIG. 6 illustrates an embodiment of a method for determining precoding information in accordance with the disclosure. The method may begin at operation 602. At operation 604, the method may determine, for a channel, a target component of precoding information. At operation 606, the method may determine at least a part of the precoding information based on the target component and a decompressed component of the precoding information. At operation 608, the method may send, from a user equipment, the at least a part of the precoding information. The method may end at operation 610.

In the embodiment illustrated in FIG. 6, and any of the embodiments disclosed herein, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A method comprising:
   determining, for a channel, a target component of precoding information;
   determining at least a part of the precoding information based on a correlation between the target component and a decompressed component of the precoding information; and
   sending, from a user equipment, the at least a part of the precoding information;
   wherein the at least a part of the precoding information provides a beamforming performance for the channel.

2. The method of claim 1, wherein the at least a part of the precoding information comprises a vector of coefficients.

3. The method of claim 2, wherein the vector of coefficients comprises a vector of complex numbers.

4. The method of claim 3, wherein at least one of the complex numbers comprises:
   an amplitude representing a scaling coefficient; and
   a phase representing a rotation coefficient.

5. The method of claim 1, wherein:
   the target component comprises a target matrix; and
   the decompressed component comprises a decompressed matrix.

6. The method of claim 5, wherein the target matrix comprises a linear combination coefficients (LCC) matrix.

7. The method of claim 1, wherein the precoding information comprises a precoding matrix indicator (PMI).

8. The method of claim 1, wherein the determining the at least a part of the precoding information comprises calculating the at least a part of the precoding information based on the target component and the decompressed component.

9. The method of claim 8, wherein the calculating comprises performing an iterative operation.

10. The method of claim 9, wherein the iterative operation comprises a gradient descent operation.

11. The method of claim 10, wherein the iterative operation comprises a heavy ball operation.

12. The method of claim 1, further comprising:
    determining a channel condition; and
    the determining the target component of the precoding information is based on the channel condition.

13. The method of claim 1, wherein the decompressed component comprises a decompressed version of the target component.

14. The method of claim 1, wherein the target component of precoding information is determined using singular value decomposition.

15. The method of claim 1, wherein:
    the target component of precoding information comprises target component of precoding information for a first subband and a second subband; and
    the at least a part of the precoding information is determined for the first subband and the second subband.

16. An apparatus comprising:
    a receiver configured to receive a reference signal using a channel;
    a transmitter configured to send precoding information for the channel; and
    a controller configured to:
       determine a target component of the precoding information based on the reference signal; and
       determine at least a part of the precoding information based on the target component and a decompressed component of the precoding information.

17. The apparatus of claim 16, wherein the controller is configured to determine the at least a part of the precoding information based on a correlation between the target component and the decompressed component.

18. The apparatus of claim 16, wherein:
    the at least a part of the precoding information comprises one or more coefficients;
    the target component comprises a target precoding coefficients matrix; and
    the decompressed component comprises a decompressed version of the target component.

19. A user equipment comprising:
at least one processor configured to:
- determine a target component of a precoding matrix for a downlink channel based on a condition of the downlink channel;
- determine a decompressed component of the precoding matrix;
- determine at least a part of the precoding matrix based on the target component and the decompressed component;
- compress the precoding matrix to generate a compressed component; and
- send the compressed component using an uplink channel.

20. The user equipment of claim 19, wherein the at least one processor is configured to determine the at least a part of the precoding matrix based on a correlation between the target component and the decompressed component.

21. The user equipment of claim 20, wherein the at least one processor is configured to determine the target component based on a coefficient matrix and a vector of scaling and rotation coefficients.

* * * * *